(12) United States Patent
Jang

(10) Patent No.: US 8,521,825 B2
(45) Date of Patent: Aug. 27, 2013

(54) ELECTRONIC MESSAGE MONITORING

(75) Inventor: Soobaek Jang, Hamden, CT (US)

(73) Assignee: International Business Machines Corporation, Armonk, NY (US)

(*) Notice: Subject to any disclaimer, the term of this patent is extended or adjusted under 35 U.S.C. 154(b) by 143 days.

(21) Appl. No.: 13/245,223

(22) Filed: Sep. 26, 2011

(65) Prior Publication Data
US 2013/0080543 A1 Mar. 28, 2013

(51) Int. Cl.
*G06F 15/16* (2006.01)
(52) U.S. Cl.
USPC ............ 709/206; 709/203; 709/224; 709/228
(58) Field of Classification Search
USPC ................... 709/203, 206, 224, 228
See application file for complete search history.

(56) References Cited

U.S. PATENT DOCUMENTS

| | | | |
|---|---|---|---|
| 6,925,605 B2* | 8/2005 | Bates et al. | 715/745 |
| 7,499,976 B2 | 3/2009 | Cato | |
| 2003/0014490 A1* | 1/2003 | Bates et al. | 709/206 |
| 2007/0106741 A1 | 5/2007 | Christoff et al. | |
| 2008/0114846 A1 | 5/2008 | Sano | |
| 2009/0210504 A1 | 8/2009 | Shuster | |
| 2009/0307316 A1 | 12/2009 | Murphy et al. | |
| 2010/0306318 A1* | 12/2010 | Fitzpatrick et al. | 709/206 |
| 2010/0318620 A1 | 12/2010 | Bansal et al. | |
| 2012/0317135 A1* | 12/2012 | Jin et al. | 707/769 |

* cited by examiner

*Primary Examiner* — Khanh Dinh
(74) *Attorney, Agent, or Firm* — Jason H. Sosa; Arthur Samodovitz

(57) ABSTRACT

A tool for preventing incorrect addressing of an electronic message. The tool analyzes incoming and outgoing electronic messages for indications that the user previously sent a message to a recipient mistakenly. The tool flags the recipient as potentially incorrect for future electronic messages. When selecting a recipient from a list, flagged recipient IDs display lower than other recipient IDs. The tool may require verification if a flagged recipient ID is selected.

12 Claims, 5 Drawing Sheets

ELECTRONIC MESSAGE MONITORING

FIELD OF THE INVENTION

The present invention relates generally to electronic mail and instant messages and more particularly to correction of addressees of the electronic mail and instant messages.

BACKGROUND OF THE INVENTION

The Internet is a global network of computers and networks joined together by gateways that handle data transfer and the conversion of messages from a protocol of a sending network to a protocol used by a receiving network. On the Internet, computers may communicate with other computers. Information between computers travels over the Internet through a variety of languages also referred to as protocols. A set of protocols used on the Internet is called the Transmission Control Protocol/Internet Protocol (TCP/IP).

It is commonplace for users to send e-mail messages and instant messages to other users through the Internet or other networks. Electronic mail (e-mail) is a widely used format to communicate over the Internet. Other types of electronic messages include, for example, text messages, as used in many cell phones, and instant messages (IMs) that can be exchanged using, for example, IBM®'s Lotus Sametime® instant messaging program or AOL®'s AIM® instant messaging program. The use of electronic messaging is commonplace for personal and business use. Individuals use electronic messaging to keep in touch with and communicate with other users. Additionally, electronic documents can be attached to electronic messaging and sent with the electronic messages.

Electronic messages may be exchanged between clients via servers. In some instances, such as in text messages, the server does little more than redirect an electronic message to a receiving client. In other instances, such as in e-mail messages, the server plays a greater role that may include both enhanced functionality and storage for e-mail messages and any attached files.

In one method for transferring e-mail messages, an electronic mail program may reside in part on a user's computer. The user drafts the e-mail message on the user's computer (including entry of at least one addressee in an address field and entry of a body of the e-mail) and the electronic mail program replicates the message (i.e., copies, uploads) to an e-mail server computer, which may sometimes be provided by an Internet Service Provider (ISP). The message is subsequently replicated (i.e., copied, downloaded) to a recipient's computer, from the e-mail server computer. An electronic mail program that commonly uses replication is Microsoft® Outlook® e-mail program.

Another common technique for sending and receiving e-mail messages is for an electronic mail program to operate primarily at the server computer. For example, in a web-based electronic mail program (webmail), such as Google®'s Gmail® program, a client may access the server computer and draft an e-mail message in a user-interface operating on the client computer. Upon "sending" the e-mail message, the server computer stores the e-mail message in association with the recipient. In web-based electronic mail programs, a copy is not typically stored on the client computer. The recipient may access the server computer from a client computer and view the e-mail message in a user interface on the client computer. The e-mail message need not be stored on the recipient client computer.

Some electronic mail programs, such as IBM®'s Lotus Notes® e-mail programs, are capable of both techniques at a user's discretion.

A known messaging program (e.g., an electronic mail program) includes or has access to a directory of user IDs, which may be on a local client computer or on a server computer. In a business environment, the directory typically includes the user IDs of all employees in the same company. A user may search the directory for a name and receive a list of matching user IDs. A known messaging program also makes a record of all user IDs to which each user has addressed an e-mail in the past, and the frequency at which the user has addressed the e-mails. The known messaging program utilizes predictive text features where, as a user enters a name or user ID into an address field, the messaging program displays a list of recipient user IDs from the directory that match the user ID to the extent it has been entered by the user, so that the user may select a recipient ID without typing the complete name or user ID.

As directories become more populated and similar names begin to accumulate, the chances of selecting, from the computer generated list, an incorrect recipient user ID increase. This is especially true for large organizations providing a messaging program for employees and including an employee directory of recipient IDs. Multiple employee names may be the same or similar, with similar recipient IDs. For example, there may be two people with the same first and last name which serves as the beginning part of a user ID, but with different geographic locations serving as the latter part of the user ID. The sender of the e-mail knows the correct first and last name, but does not know the correct geographic location for the latter part of the user ID. There are known techniques that attempt to prevent a user, or at least reduce the chances, from sending an electronic message to an incorrect recipient.

One technique includes meeting a relatedness threshold, where the message is compared to prior messages to the same recipient ID (via keywords and topics) to determine if the messages are related. Similar keywords and topics suggest that the recipient ID is indeed the intended ID. A second technique measures usage history by the user, as sending a message by the user to a commonly used recipient ID addressed by the user has a higher probability of being correct than a rarely used recipient ID addressed by the user.

US Patent Application 2009/0210504, by Gary Shuster, entitled "Erroneous Addressing Prevention for Electronic Messaging" and filed Feb. 17, 2009 (the Shuster application), herein incorporated by reference as part of the present disclosure, describes the use of similar techniques. For example, the Shuster application discusses a method whereby a program may assess risk of error in addressing using a weighted multi-factor analysis implemented by a programmed analysis algorithm. In the multi-factor analysis, a numerical score may be assigned based on multiple parameters. These parameters may include the length of time since each previous addressee has been e-mailed, the quantity of times addressees have been sent e-mails together, if any, the presence of designated keywords in the message and similarity. E-mail parameters may be determined from past message data that is stored, maintained and updated on a local or remote database. Each time a message is transmitted, the program may update an activity score for each recipient addressee of the outgoing message. The activity score may provide a measure of the number of times each addressee has been a message recipient, weighted by a measure of how recent the message activity is. If the score suggests that the probability of an addressing error meets a predefined risk threshold, the program may require user confirmation. It was known for the predictive text feature to suggest to the user only those recipient IDs to which the user had previously sent e-mails or from which the user had previously received e-mails.

These are positive indicators where scores or ranks are increased in response to certain events. A recipient ID is questioned if it does not meet some threshold of positive indicators. An object of the present invention is to improve ranking of matching recipient IDs to which e-mails have been addressed by the user in the past.

SUMMARY

In one aspect of an embodiment of the present invention, a method, system, and computer program product are disclosed for ranking potential recipients of electronic messages. A computer searches an electronic message, which is a response to a prior electronic message and was sent from a user address to which the prior electronic message was sent, for key words indicative of the user address being improper in the prior electronic message. The computer, in response to the key words not indicating to the computer that the user address was improper in the prior electronic message, increases an activity score wherein a ranking for the user address is derived in part from the activity score and indicates a probability that the user address is a legitimate addressee for electronic messages subsequently created by a creator of the prior electronic message. The computer, in response to the key words indicating that the user address was improper in the prior electronic message, does not increase, or alternatively decreases the activity score so that the ranking of the user address indicates a lesser probability that the user address is a legitimate addressee for electronic messages subsequently created by the creator of the prior electronic message than if the key words did not indicate to the computer that the user address was improper in the prior electronic message. The computer, in response to receiving, from the creator of the prior electronic message, one or more characters of the user address in an address field of a form for a subsequent electronic message, displaying, in association with the form, one or more complete addresses that correspond to the one or more characters entered, including the user address, as potential legitimate addresses for the electronic message, and indicating the ranking of the user address in comparison to another of the one or more complete addresses.

A second aspect of an embodiment of the present invention discloses a method, system, and program product for preventing incorrect addressing of electronic messages. A computer receives a plurality of characters of a user address in a recipient field for an electronic message. The computer, based on the plurality of characters, determines a list of potentially legitimate user addresses corresponding to the plurality of characters, wherein one of the potentially legitimate user addresses is intended by a creator of the electronic message. The computer obtains a ranking for each respective user address in the list based on previously exchanged electronic messages between the creator of the electronic message and the respective user addresses in the list. The ranking indicates a probability that the respective user address is the user address intended by the creator of the electronic message. For each respective user address, a score the ranking is derived from, in part, is increased for each previously exchanged electronic message that is determined to be properly addressed and the score is unaffected or decreased for each previously exchanged electronic message that is determined to be improperly addressed or elicited by a previously improperly addressed electronic message.

DETAILED DESCRIPTION

Figure 1:
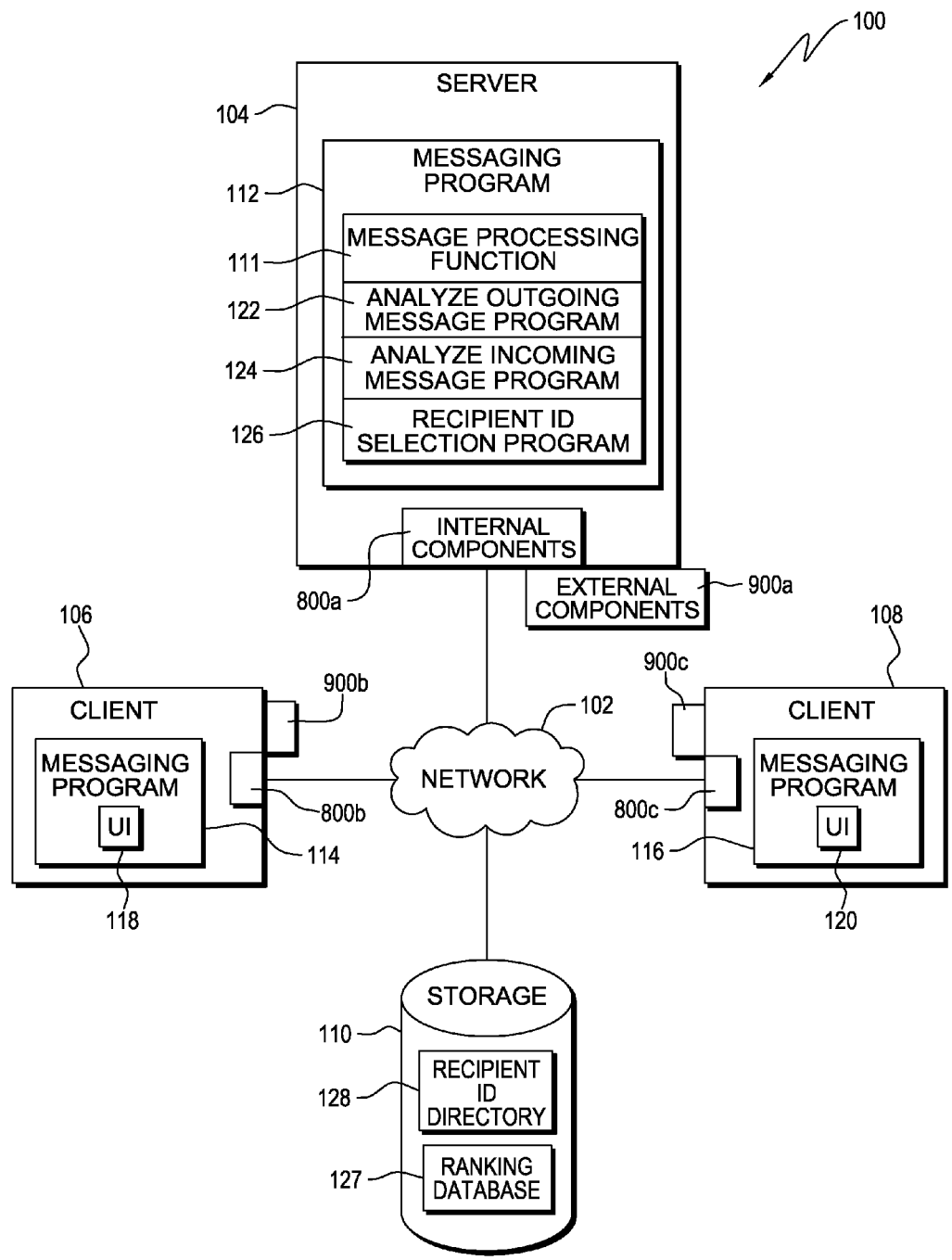
FIG. 1 is a block diagram of a distributed data processing system according to an embodiment of the present invention.

The present invention will now be described in detail with reference to the figures. FIG. 1 illustrates a distributed data processing system, generally designated 100, according to one embodiment of the present invention.

Data processing system 100 comprises a network 102, a server computer 104, multiple client computers such as client computers 106 and 108 and a network storage device 110 containing a recipient/user ID directory 128. Network 102 includes wire cables, wireless communication links, fiber optic cables, routers, switches and/or firewalls. Server computer 104, client computers 106 and 108, and network storage device 110 are interconnected by network 102. Server computer 104 may be, for example, a server computer system such as a management server, a web server, or any other electronic device or computing system capable of receiving and sending data. In another embodiment, server computer 104 represents a "cloud" of computers interconnected by one or more networks, where server computer 104 is a primary server for a computing system utilizing clustered computers and components to act as a single pool of seamless resources when accessed through network 102. This is a common implementation for data centers in addition to cloud computing applications. Client computers 106 and 108 are clients to server computer 104 and may be, for example, a notebook, a laptop computer, a tablet computer, a handheld device or smart-phone, a thin client, or any other electronic device or computing system capable of communicating with server computer 104 through network 102.

Server computer 104 executes server messaging program 112 for receiving, forwarding, and managing electronic messages, such as e-mail, instant messages and text messages, between client computer 106 and client computer 108. In the former case, messaging program 112 comprises an e-mail program. Client messaging programs 114 and 116, execute on client computers 106 and 108, respectively. Client messaging programs 114 and 116 communicate securely with server messaging program 112 and provide respective user interfaces 118 and 120 for composing and viewing electronic messages.

Server messaging program 112 includes a known message processing function 111 to manage e-mail and text messages. In the former case, the processing function 111 downloads a list of incoming messages and "sent" messages upon request by a user, and enables a user to compose and send new e-mails and open and read e-mails which have been received. In the latter case, the processing function 111 keeps track of active user IDs and their locations, receives text messages and user IDs that the text messages are addressed to, and routes the text message to the location of the user ID.

Server messaging program 112 also executes the following programs and functions to prevent addressing of electronic messages to an erroneous recipient. Towards that end, an analyze outgoing message program 122 and an analyze incoming message program 124 search text within a subject field or body of outgoing and incoming messages for key words or phrases (such as "wrong recipient" or "wrong John Smith" (where "John Smith is the recipient's name) or "sorry") indicating that a recipient ID was incorrect and, in response to discovering such indications, flag the recipient ID as potentially incorrect. Such a flag lowers a ranking score given to the recipient ID and triggers user verification when attempting to send an electronic message to that recipient ID.

According to the present invention, recipient ID selection program 126 may increase a ranking for a recipient ID, every time a message is sent to or received from that recipient ID, as is known in the art. Recipient ID selection program 126 also, however, subtracts from the ranking for each recipient any prior e-mail exchanges between the sender and the recipient that were incorrectly addressed to the recipient and follow-up notifications to the sender. So, if the wrong John Smith received an e-mail from the sender and responded with an e-mail to the sender stating, "wrong John Smith", recipient ID selection program 126 detects this e-mail as a follow-up to an incorrectly addressed e-mail, based on this key phrase, and subtracts from the ranking the e-mail sent to the wrong John Smith (which was referenced by the responsive e-mail) as well as the responsive e-mail (stating "wrong John Smith"). Thus, recipient ID selection program 126 generates rankings which better reflect the likelihood of intended communication between a sender and his or her addressees/recipients. A ranking database 127 records, for each user ID in directory 128, a list of the other user IDs to which the each user ID has communicated by e-mail in the past and the number of times that each user ID has communicated by e-mail in the past to each of the other user IDs.

User IDs are stored in directory 128. For example, if the user is an employee of a corporation, the directory 128 lists all the other employees of the corporation along with their user IDs. Typically, in this corporate case, the employee's name or name abbreviation forms the first part of the user ID and the employee's work location and the name of the corporation form a latter part of the user ID. Such a directory is also PRIOR ART. A user can search directory 128 to determine a user ID. As explained above, database 127 stores rankings in conjunction with each combination of user ID and past recipient IDs. In the embodiment depicted in FIG. 1, directory 128 and database 127 are databases on network storage 110. In an alternative embodiment, directory 128 and database 127 are stored on local storage of server computer 104. In one embodiment, rankings may affect the order in which the recipient IDs are presented to a user as he or she types a recipient ID or trigger a suggestion to the sender of the proper recipient ID which matches the user name typed in whole or in part by the sender.

In another embodiment of the present invention, analyze outgoing message program 122, analyze incoming message program 124, and recipient ID selection program 126 are part of messaging programs 114 and 116 installed in client computers 106 and 108, respectively. In such an embodiment a local directory of recipient IDs and the ranking database 127 may be stored on client computers 106 and 108.

Data processing system 100 may include additional server computers, client computers, displays and other devices not shown.

Server computer 104 and client computers 106 and 108, each maintain respective internal components 800a, 800b, and 800c, and respective external components 900a, 900b, and 900c. In general, server computer 104 and client computers 106 and 108 can be any programmable electronic device as described in further detail with respect to FIG. 5.

In the depicted example, network 102 is the Internet representing a worldwide collection of networks and gateways that use the Transmission Control Protocol/Internet Protocol suite of protocols to communicate with one another. Network 102 may also be implemented as a number of different types of networks, such as an intranet, a local area network (LAN), or a wide area network (WAN). FIG. 1 is intended as an example, and not as an architectural limitation for the different embodiments.

Figure 2:
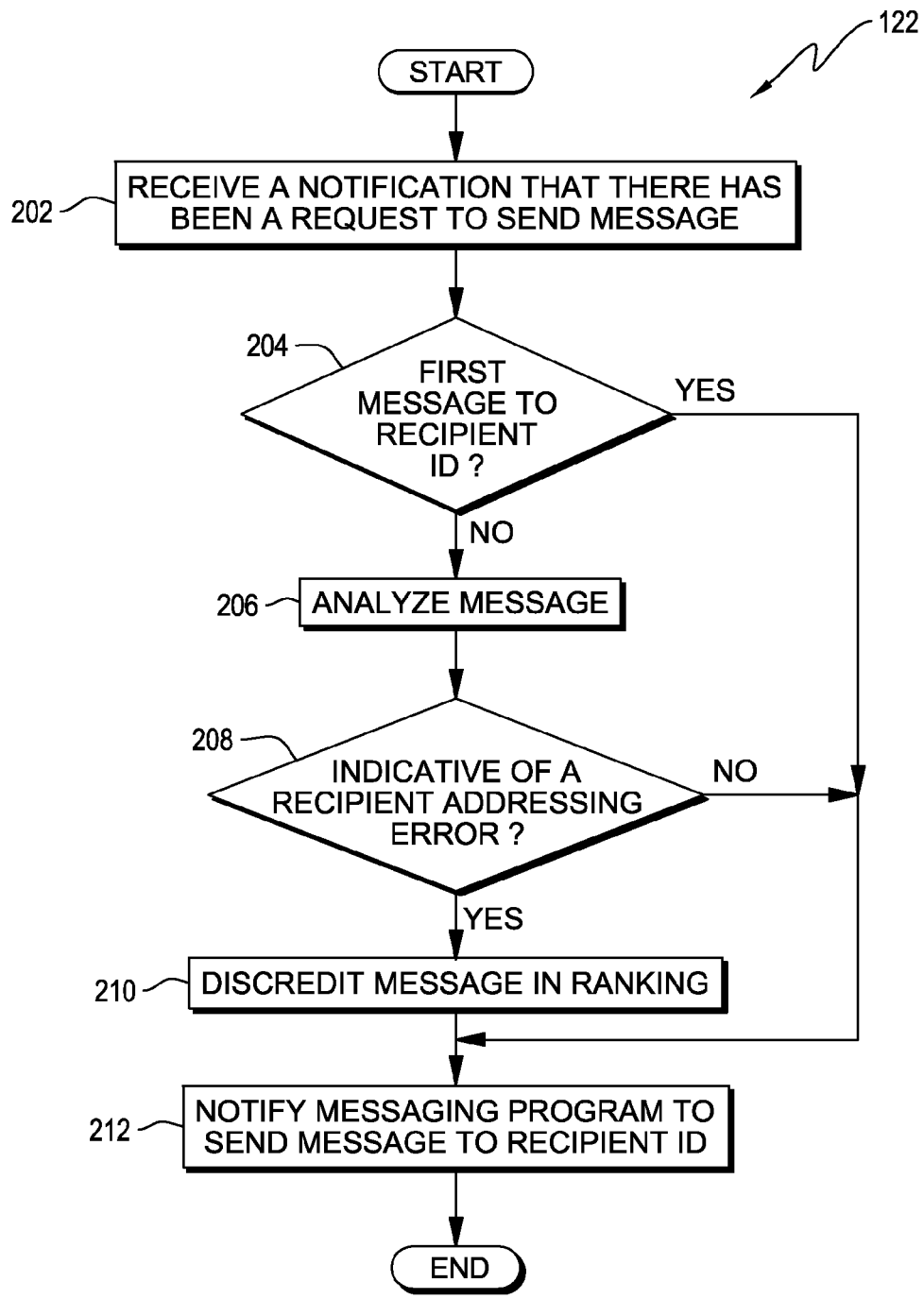
FIG. 2 is a flowchart of the steps of a program, residing on the server computer of FIG. 1, for searching an outgoing electronic message for indications that a recipient ID of the outgoing message has been previously used incorrectly, in accordance with an embodiment of the present invention.

FIG. 2 is a flowchart of the steps of analyze outgoing message program 122 for searching an outgoing message for indications that the recipient ID has been incorrectly used, in accordance with an embodiment of the present invention.

In step 202, analyze outgoing message program 122 receives a notification, from a function in server messaging program 112 that processes requests to send an electronic message, that a request has been made to send the e-mail. Next, analyze outgoing message program 122 determines if this is the first time that an electronic message is being sent to the recipient ID from the user (decision block 204).

If this is the first time that the user has sent an electronic message to the recipient ID (positive branch of decision block 204), then there can be no historical indication that the recipient ID is incorrect and program 122 accepts the recipient ID as correct, may record the e-mail communication between the sender and the recipient in the ranking database 127 to indicate a properly addressed e-mail between the sender and the recipient ID, and notifies the processing function in the messaging program to send the electronic message (step 212). Otherwise (negative branch of decision block 204), program 122 analyzes the message to determine if the message is or results from an improperly addressed electronic message (step 206).

When analyzing the electronic message, program 122 searches for key words or key phrases which indicate that the recipient ID to which the current electronic message is being sent was an addressee of a previous electronic message sent by the same sender and was incorrect. For example, if a user sent a message to an incorrect recipient, the recipient may respond with an e-mail notifying the sender of the mistake and the sender may send the same recipient a second message acknowledging and apologizing for the mistake. If the recipient does not notify the sender of the mistake, and if the sender later learns of the mistake through other means, the sender may send another e-mail to the recipient apologizing for the mistake. Program 122 examines both the subject line (in an e-mail) and the message body for indications of such an error. Indications include words such as "apology," "apologize,"

"sorry," in combination with words such as "unintended," "mistaken," "wrong," and "recipient," "name," "person," or "wrong XYZ" where "XYZ" is the name of the recipient, etc. How close these words are to each other within the same sentence or paragraph increases the likelihood that the recipient ID was previously used unintentionally.

Program 122 determines if the analysis is indicative of a recipient addressing error (decision block 208). In a preferred embodiment, program 122 calculates the probability, based on the indications, that a recipient ID error was previously made in an e-mail that elicited the current e-mail.

If program 122 determines that a recipient ID error was not made in a previous e-mail eliciting the current e-mail (negative branch of decision 208), program 122 may record the e-mail communication between the sender and the recipient in the ranking database 127 to indicate a properly addressed e-mail between the sender and the recipient ID, and notifies the processing function in the messaging program to send the electronic message (step 212). If program 122 determines that a recipient ID error has been made in a previous e-mail eliciting the current e-mail (positive branch of decision 208), program 122 does not add the e-mail communication between the sender and the recipient in the ranking database 127, and preferably includes a negative indicator in the ranking database 127, because this e-mail should not validate a subsequent e-mail between the same sender and the same recipient and preferably should decrease the preference for this recipient in a subsequent e-mail from the sender (step 210).

Step 210 discredits the message, indicating that the recipient ID has received (or likely received) a message improperly. In one embodiment, a "negative" score count is kept, and for each negative indication, the negative score is increased. For example, every time a message is discredited, a ranking score for the recipient ID of the message is decreased by 1. In any embodiment, the electronic message should not be used to increase the recipient IDs ranking and should be excluded from the history of electronic messages to be searched for positive indicators. For example, if a positive score is increased every time a recipient ID is used (i.e., the more times a recipient ID has been used, the more likely that the recipient ID is correct) a flurry of electronic messages back and forth acknowledging and apologizing for the mistake would incorrectly indicate that the recipient ID is likely the correct one. Removing these messages from the calculations would reflect a more accurate picture. A preferred embodiment includes both a negative score and a removal of the electronic message from a searchable history of positive indicators.

Program 122 subsequently notifies the processing function in the messaging program to send the electronic message (step 212).

Figure 3:
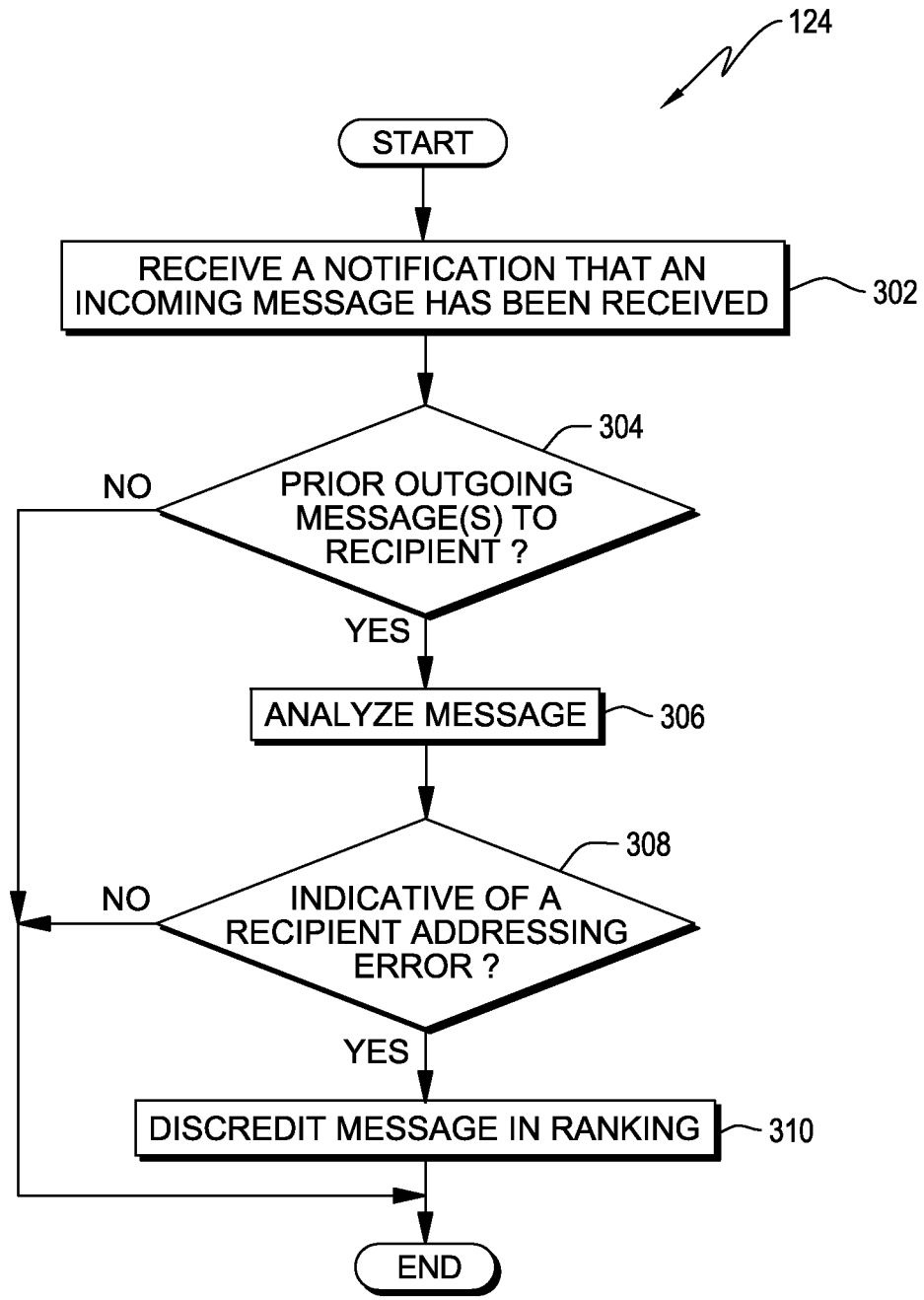
FIG. 3 is a flowchart of the steps of a program, residing on the server computer of FIG. 1, for searching an incoming electronic message for indications that the recipient ID of the incoming message has been previously used incorrectly, in accordance with an embodiment of the present invention.

FIG. 3 is a flowchart of the steps of analyze incoming message program 124 for searching an incoming message for indications that the recipient ID has been incorrectly used, in accordance with an embodiment of the present invention.

Analyze incoming message program 124 begins by receiving a notification from the messaging program that an incoming electronic message has been received (step 302). Analyze incoming message program 124 determines if the user has sent any prior outgoing electronic messages to the recipient ID (decision block 304). If program 124 determines that no electronic messages have been previously sent to the recipient ID (negative branch of decision 304), then the message cannot be indicative of a prior recipient addressing error and program 124 ends. If the recipient ID has been previously used (positive branch of decision 304) then program 124 analyzes the message (step 306). Similar to step 206 for analyze outgoing message program 122, analyze incoming message program 124 searches for key words or phrases indicative of the recipient ID of the incoming electronic message being previously used incorrectly in a message eliciting the current incoming electronic message. The subject line and body of the message are scanned for indicative phraseology.

In response, program 124 determines if the analysis is indicative of a recipient addressing error (decision block 308). If the program 124 determines that there is no indication of a recipient addressing error (negative branch of decision 308), program 124 ends. If program 124 determines, on the other hand, that there is an indication of a recipient addressing error (positive branch of decision 308), program 124 does not add the e-mail communication between the sender and the recipient in the ranking database 127, and preferably includes a negative indicator in the ranking database 127 for the recipient ID (step 310) in a manner similar to step 210 of program 122. Subsequent to discrediting the message, program 124 ends.

Figure 4:
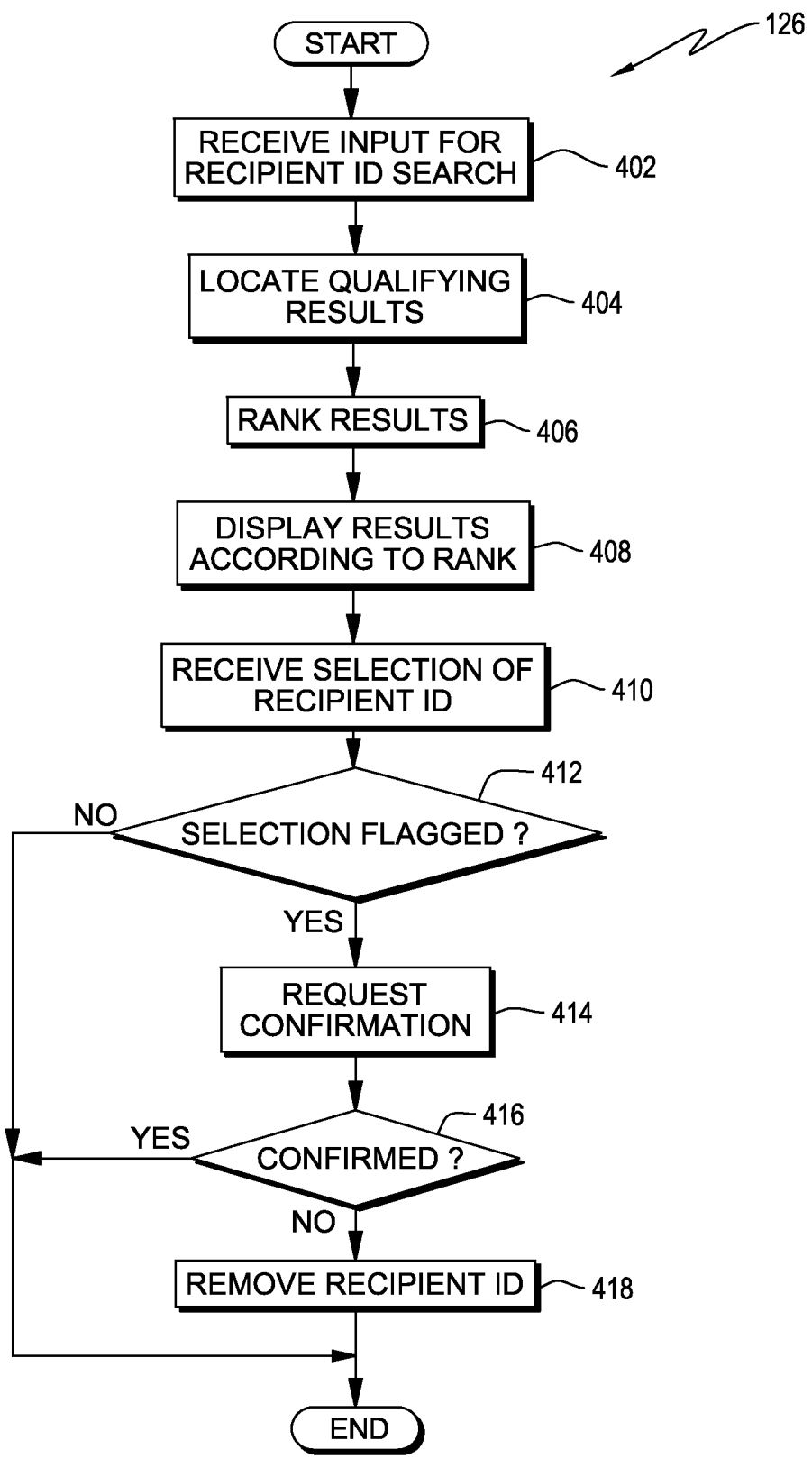
FIG. 4 is a flowchart of the steps of a recipient ID selection program, residing on the server computer of FIG. 1, for preventing the selection of an erroneous recipient ID, in accordance with an embodiment of the present invention.

FIG. 4 is a flowchart of the steps of recipient ID selection program 126 for preventing the selection of an erroneous recipient ID, in accordance with an embodiment of the present invention.

Recipient ID selection program 126 receives input for a recipient ID search, typically through user/sender entry of characters of a recipient ID in a "to" or "cc" field of an e-mail or instant message (step 402). In one embodiment, the input is a complete recipient's name, such that the search is commenced after the user/sender enters enough characters to form at least one complete recipient name. In another embodiment, the input is one or more beginning letters of a desired recipient's name or recipient ID. For example, in a messaging program using a predictive text feature, with the addition of every single letter typed by the sender/creator of the e-mail, the program searches for potential matching names and/or recipient IDs.

Subsequent to receiving the input, recipient ID selection program 126 searches the directory to locate qualifying results (step 404). Depending upon the name or letters received, different numbers of potential recipient IDs may be located. Recipient ID selection program 126 ranks these results (step 406) and displays them to the user according to that rank (step 408). As explained above, the number of prior e-mails between this sender and each of the potential recipients that do not include indicia of a mistaken recipient ID increase the ranking for the corresponding potential recipient, where the greater the number the higher the rank. Prior e-mails that do include indicia of mistaken recipient ID decrease the ranking for the corresponding potential recipient.

According to the present invention, recipient ID selection program 126 displays the potential recipient IDs in a top to bottom list ordered by rank, allowing the user to see the most probable correct recipient IDs first, and reduces the chances of the user selecting an incorrect recipient ID. Also, using the negative indicators means that even if the correct recipient ID has never been previously selected by the user, the correct recipient ID will still display more prominently than recipient IDs that have been incorrectly selected for a previous electronic message. Thus, the rank may take into account both positive and negative scores.

Subsequent to displaying the potential recipient user IDs to the user in ranked order, recipient ID selection program 126 receives a (cursor, key board/pad or touch) selection of a recipient user ID from the user (step 410). Program 126 determines if the selected recipient ID has been flagged in a prior e-mail as an incorrect recipient (decision block 412). If the selection has not been flagged (negative branch of decision 412), program 126 ends, allowing the selected recipient ID to stand. If the selection has been flagged (positive branch of decision 412), program 126 requests a confirmation, such as another cursor, key board/pad or touch entry, (step 414) of the selection from the user. Even though a recipient ID that has been flagged displays lower in the list of possible selections, in the preferred embodiment, program 126 still presents the user with this opportunity to double check. An exemplary request for confirmation might read: "From your history of interaction with this John Smith, it appears that this might not be the person you intend to send this to. Do you wish to proceed?"

Based on a user response, program 126 determines if the recipient ID is confirmed (decision block 416). If the recipient ID is confirmed (positive branch of decision 416), program 126 ends, allowing the selected recipient ID to stand. If the recipient ID is not confirmed (negative branch of decision 416), program 126 removes the recipient ID (step 418) as the recipient for the electronic message.

Figure 5:
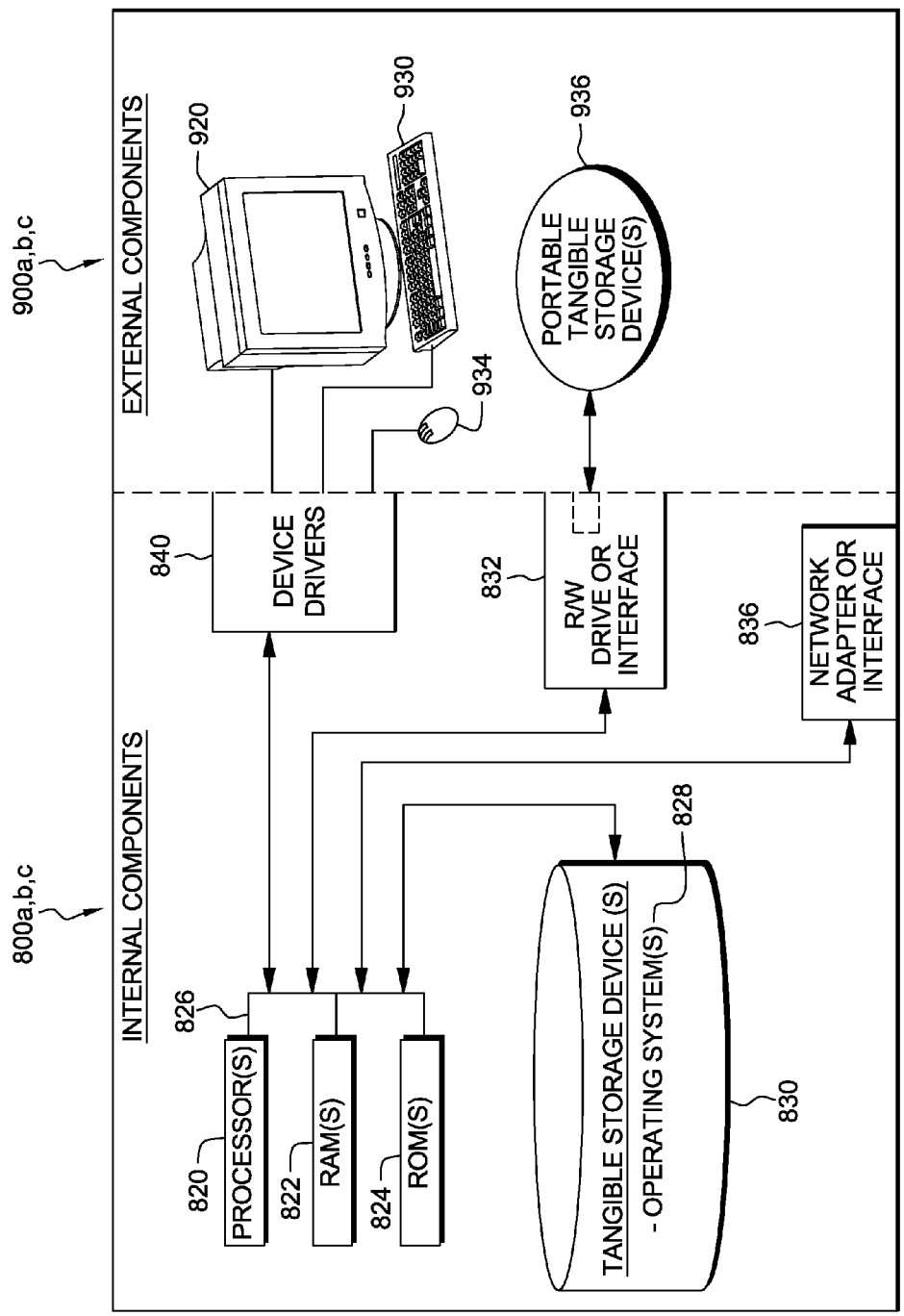
FIG. 5 depicts a block diagram of components of a data processing system (such as the server computer and client computers of FIG. 1) depicted in accordance with an illustrative embodiment.

FIG. 5 shows a block diagram of the components of a data processing system 800, 900, such as server computer 104, client computer 106, or client computer 108, in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multi-processor systems, microprocessor-based systems, network PCs, minicomputer systems, and distributed cloud computing environments that include any of the above systems or devices.

Server computer 104, client computer 106, or client computer 108 include respective sets of internal components 800a, b, c and external components 900a, b, c illustrated in FIG. 5. Each of the sets of internal components 800a, b, c includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs 111, 112, 122, 124, and 126 in server computer 104; program 114 in client computer 106; and program 116 in client computer 108 are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, b, c also includes a R/W drive or interface 832 to read from and write to one or more portable computer-readable tangible storage devices 936 such as a CD-ROM, DVD, memory stick, magnetic tape, magnetic disk, optical disk or semiconductor storage device. The programs 111, 112, 122, 124, and 126 in server computer 104; program 114 in client computer 106; and program 116 in client computer 108 can be stored on one or more of the respective portable computer-readable tangible storage devices 936, read via the respective R/W drive or interface 832 and loaded into the respective hard drive 830.

Each set of internal components 800a, b, c also includes network adapters or interfaces 836 such as a TCP/IP adapter cards, wireless wi-fi interface cards, or 3G or 4G wireless interface cards or other wired or wireless communication links. The programs 111, 112, 122, 124, and 126 in server computer 104; program 114 in client computer 106; and program 116 in client computer 108 can be downloaded to respective computers 104, 106, and 108 from an external computer via a network (for example, the Internet, a local area network or other, wide area network) and respective network adapters or interfaces 836. From the network adapters or interfaces 836, the programs 111, 112, 122, 124, and 126 in server computer 104; program 114 in client computer 106; and program 116 in client computer 108 are loaded into the respective hard drive 830. The network may comprise copper wires, optical fibers, wireless transmission, routers, firewalls, switches, gateway computers and/or edge servers.

Each of the sets of external components 900a, b, c can include a computer display monitor 920, a keyboard 930, and a computer mouse 934. External components 900a, b, c can also include touch screens, virtual keyboards, touch pads, pointing devices, and other human interface devices. Each of the sets of internal components 800 a, b, c also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The aforementioned programs can be written in various programming languages (such as Java or C++) including low-level, high-level, object-oriented or non object-oriented languages. Alternatively, the functions of the aforementioned programs can be implemented in whole or in part by computer circuits and other hardware (not shown).

Based on the foregoing, a method, computer system, and computer program product have been disclosed for preventing incorrect addressing for an electronic message. However, numerous modifications and substitutions can be made without deviating from the scope of the present invention. In this regard, each block in the flowcharts or block diagrams may represent a module, segment, or portion of code, which comprises one or more executable instructions for implementing the specified logical functions(s). It should also be noted that, in some alternative implementations, the functions noted in the block may occur out of the order noted in the figures. Therefore, the present invention has been disclosed by way of example and not limitation.

What is claimed is:

1. A computer program product for ranking potential recipients of electronic messages, the computer program product comprising:
   one or more computer-readable tangible storage devices and program instructions stored on at least one of the one or more storage devices, the program instructions comprising:

program instructions to direct a computer to search an electronic message, which is a response to a prior electronic message and was sent from a user address to which the prior electronic message was sent, for key words indicative of the user address being improper in the prior electronic message;

program instructions to, in response to the key words not indicating to the computer that the user address was improper in the prior electronic message, increase an activity score wherein a ranking for the user address is derived in part from the activity score and indicates a probability that the user address is a legitimate addressee for electronic messages subsequently created by a creator of the prior electronic message, and wherein in response to the key words indicating to the computer that the user address was improper in the prior electronic message, the activity score is not increased so that the ranking of the user address indicates a lesser probability that the user address is a legitimate addressee for electronic messages subsequently created by the creator of the prior electronic message than if the key words did not indicate to the computer that the user address was improper in the prior electronic message; and program instructions to, in response to receiving, from the creator of the prior electronic message, one or more characters of the user address in an address field of a form for a subsequent electronic message, display, in association with the form, one or more complete addresses that correspond to the one or more characters entered, including the user address, as potential legitimate addresses for the electronic message, and indicate the ranking of the user address in comparison to another of the one or more complete addresses.

2. The computer program product of claim 1, further comprising program instructions, stored on at least one of the one or more storage devices, to, in response to the key words indicating to the computer that the user address was improper in the prior electronic message, decrease the activity score.

3. The computer program product of claim 1, further comprising program instruction, stored on at least one of the one or more storage devices, to, in response to the key words not indicating to the computer that the user address was improper in the prior electronic message, save the electronic message in a history of electronic messages between the creator of the prior electronic message and the user address.

4. The computer program product of claim 1, further comprising program instructions, stored on at least one of the one or more storage devices, to, in response to the key words indicating to the computer that the user address was improper in the prior electronic message, remove the prior electronic message from a history of electronic messages between the creator of the prior electronic message and the user address.

5. A computer program product for ranking potential recipients of electronic messages, the computer program product comprising:

one or more computer-readable tangible storage devices and program instructions stored on at least one of the one or more storage devices, the program instructions comprising:

program instructions to direct a computer to search an electronic message, which is addressed to a user address that a prior electronic message and was sent to from the same creator, for key words indicative of the user address being improper in the prior electronic message;

program instructions to, in response to the key words not indicating to the computer that the user address was improper in the prior electronic message, increase an activity score wherein a ranking for the user address is derived in part from the activity score and indicates a probability that the user address is a legitimate addressee for electronic messages subsequently created by the creator of the electronic message, and wherein in response to the key words indicating to the computer that the user address was improper in the prior electronic message, the activity score is not increased so that the ranking of the user address indicates a lesser probability that the user address is a legitimate addressee for electronic messages subsequently created by the creator of the electronic message than if the key words did not indicate to the computer that the user address was improper in the prior electronic message; and program instructions to, in response to receiving, from the creator of the electronic message, one or more characters of the user address in an address field of a form for a subsequent electronic message, display, in association with the form, one or more complete addresses that correspond to the one or more characters entered, including the user address, as potential legitimate addresses for the electronic message, and indicate the ranking of the user address in comparison to another of the one or more complete addresses.

6. The computer program product of claim 5, further comprising program instructions, stored on at least one of the one or more storage devices, to, in response to the key words indicating to the computer that the user address was improper in the prior electronic message, decrease the activity score.

7. The computer program product of claim 5, further comprising program instruction, stored on at least one of the one or more storage devices, to, in response to the key words not indicating to the computer that the user address was improper in the prior electronic message, save the electronic message in a history of electronic messages between the creator of the electronic message and the user address.

8. The computer program product of claim 5, further comprising program instructions, stored on at least one of the one or more storage devices, to, in response to the key words indicating to the computer that the user address was improper in the prior electronic message, remove the prior electronic message from a history of electronic messages between the creator of the electronic message and the user address.

9. A computer program product for preventing incorrect addressing of electronic messages, the computer program product comprising:

one or more computer-readable tangible storage devices and program instructions stored on at least one of the one or more storage devices, the program instructions comprising:

program instructions to receive a plurality of characters of a user address in a recipient field for an electronic message;

program instructions to, based on the plurality of characters, determine a list of potentially legitimate user addresses corresponding to the plurality of characters, wherein one of the potentially legitimate user addresses is intended by a creator of the electronic message; and program instructions to obtain a ranking for each respective user address in the list based on previously exchanged electronic messages between the creator of the electronic message and the respective user addresses in the list, wherein the ranking indicates a probability that the respective user address is the user address intended by the creator of the electronic message, and wherein, for each respective user address, a score the ranking is derived from, in part, is increased for each previously exchanged electronic message that is determined to be properly addressed and the score is unaffected or decreased for each previously exchanged electronic message that is determined to be improperly addressed or elicited by a previously improperly addressed electronic message.

10. The computer program product of claim 9, further comprising program instructions, stored on at least one of the one or more storage devices, to:
   display the list of potentially legitimate user addresses and an indication of the ranking for each respective user address to the creator of the electronic message; and
   receive a selection from the creator of the electronic message of a respective user address.

11. The computer program product of claim 10, wherein the program instructions to display the list of potentially legitimate user addresses and the indication of the ranking for each respective user address comprises program instructions to display a user address with a ranking indicating a higher probability of being the user address intended by the creator more prominently than a user address with a ranking indicating a lower probability of being the user address intended by the creator.

12. The computer program product of claim 9, further comprising program instructions, stored on at least one of the one or more storage devices, to, in response to receiving a selection of a respective user address from the creator of the electronic message, determine if the selection meets a threshold ranking, and in response to determining that the selection does not meet the threshold ranking, request confirmation of the selection from the creator of the electronic message.

* * * * *